United States Patent
Diprose et al.

(10) Patent No.: US 12,329,144 B2
(45) Date of Patent: Jun. 17, 2025

(54) APPARATUS AND METHOD FOR ELECTRICALLY KILLING PLANTS WITH CONTROL OF PROPERTIES OF THE ELECTRICAL ENERGY

(71) Applicant: Ubiqutek Ltd., Birmingham (GB)

(72) Inventors: Andrew Diprose, London (GB); Pravin Iyengar, Banbury (GB); Uma Kalluru, Didcot (GB)

(73) Assignee: Ubiqutek Ltd., Warwickshire (GB)

( * ) Notice: Subject to any disclaimer, the term of this patent is extended or adjusted under 35 U.S.C. 154(b) by 179 days.

(21) Appl. No.: 18/012,833

(22) PCT Filed: Sep. 22, 2021

(86) PCT No.: PCT/EP2021/076101
§ 371 (c)(1),
(2) Date: Dec. 23, 2022

(87) PCT Pub. No.: WO2022/069322
PCT Pub. Date: Apr. 7, 2022

(65) Prior Publication Data
US 2023/0270098 A1    Aug. 31, 2023

(30) Foreign Application Priority Data

Sep. 29, 2020  (EP) .................................. 20199039
Aug. 12, 2021  (GB) ................................. 202111564

(51) Int. Cl.
*A01M 21/04*    (2006.01)
(52) U.S. Cl.
CPC ................................ *A01M 21/046* (2013.01)
(58) Field of Classification Search
CPC ................................................... A01M 21/046
See application file for complete search history.

(56) References Cited

U.S. PATENT DOCUMENTS 3,935,670 A * 2/1976 Pluenneke .......... A01M 21/046
47/1.3
4,338,743 A 7/1982 Gilmore
(Continued)

FOREIGN PATENT DOCUMENTS

EP    3557750 A1 * 10/2019   .......... A01M 21/046
EP    3834614 A1 *  6/2021   .......... A01M 21/046
(Continued)

OTHER PUBLICATIONS

PCT International Search Report and Written Opinion; International Application No. PCT/EP2021/076101; International Filing Date Sep. 22, 2021; 12 pages.

*Primary Examiner* — Sisay G Tiku
(74) *Attorney, Agent, or Firm* — Umberg Zipser LLP; Ryan Dean

(57) ABSTRACT

Electrical apparatus to kill a plant or at least attenuate plant growth, the apparatus comprising: an electrical energy supply unit; an applicator unit comprising an applicator electrode; a return unit comprising a return electrode; electrical circuitry; the electrical energy supply unit arranged to apply electrical energy through a transmission circuit comprising the applicator electrode, a plant, and the return electrode, the electrical circuitry implemented to: determine if a temperature of the apparatus has crossed a temperature threshold, and; determine if one or more electrical properties of the electrical energy has crossed an associated electrical property threshold(s); and if either the temperature or the one or more electrical properties has crossed the respective temperature threshold or electrical property thresholds, then to control one or more electrical properties of the of the electrical energy to reduce the temperature and/or electrical property that has exceeded the threshold.

16 Claims, 5 Drawing Sheets

(56) References Cited

U.S. PATENT DOCUMENTS

| | | | |
|---|---|---|---|
| 10,925,984 B2* | 2/2021 | Koppert | ................ A01M 21/04 |
| 2003/0215354 A1 | 11/2003 | Clark et al. | |
| 2006/0265946 A1* | 11/2006 | Schwager | ........... A01M 21/046 |
| | | | 47/1.3 |
| 2010/0324549 A1* | 12/2010 | Marion | .............. A61B 18/1206 |
| | | | 606/42 |
| 2018/0055036 A1* | 3/2018 | Diprose | ................... A01H 3/04 |
| 2018/0132473 A1* | 5/2018 | Diprose | ............. A01M 21/046 |
| 2022/0095605 A1* | 3/2022 | Diprose | ............. A01M 21/046 |

FOREIGN PATENT DOCUMENTS

| | | | | |
|---|---|---|---|---|
| EP | 3912469 A1 * | 11/2021 | | ......... A01M 21/046 |
| WO | WO-03099004 A2 * | 12/2003 | | ............ A01G 11/00 |
| WO | WO-2004086860 A1 * | 10/2004 | | ............ A01B 35/00 |
| WO | 2016016627 A1 | 2/2016 | | |
| WO | WO-2019052591 A1 * | 3/2019 | | ......... A01M 21/046 |
| WO | WO-2020182829 A1 * | 9/2020 | | ............... A01G 7/04 |
| WO | WO-2022144371 A2 * | 7/2022 | | ......... A01M 21/046 |
| WO | WO-2023017272 A1 * | 2/2023 | | ......... A01M 21/046 |

\* cited by examiner

APPARATUS AND METHOD FOR ELECTRICALLY KILLING PLANTS WITH CONTROL OF PROPERTIES OF THE ELECTRICAL ENERGY

TECHNICAL FIELD

The present disclosure relates to electric apparatus that is configured to attenuate plant growth by the application of electrical energy thereto.

BACKGROUND

In properties both commercial and domestic, it is common to kill or at least control the growth of unwanted plants, commonly referred to as weeds. Conventional methods include treatment with a pesticide or more particularly a herbicide. However, there is a growing concern over such treatment for environmental reasons and unwanted exposure of herbicides to humans and animals. Moreover, weeds are increasingly becoming naturally resistant so herbicides are becoming more and more ineffective. As a result of these numerous drawbacks, consumers are increasingly demanding organic produce, for which the use of herbicides is increasingly prohibited.

Consequently, there is a desire for alternative treatments, which do not include the above drawbacks. An example includes treatment by the application of electrical energy. U.S. Pat. No. 4,338,743 A discloses such apparatus, wherein an electrical energy is applied at 14.4 kV at 60±5 Hz to plants.

Such apparatus have failed to become widespread in the market over concern over safety. For example, the high voltage may be a risk to a person in proximity to a treated weed. Such apparatus have also failed to become widespread in the market since it can be difficult to control the electrical energy to the plant to ensure it is supplied at the highest power the apparatus is capable of (to ensure maximum treatment efficacy) whilst ensuring componentry of the apparatus are not damaged.

Therefore, in spite of the effort already invested in the development of said apparatus further improvements are desirable.

SUMMARY

The present disclosure provides electrical apparatus to kill a plant or at least attenuate plant growth including weaken a plant. The apparatus includes an electrical energy supply unit; an applicator unit comprising an applicator electrode; a return unit comprising a return electrode and; electrical circuitry. The electrical energy supply unit is arranged to apply electrical energy through a transmission circuit comprising the applicator electrode and the return electrode and a plant.

In embodiments, the electrical circuitry is implemented to: determine if a temperature of the apparatus has crossed a temperature threshold, and/or; determine if one or more electrical properties of the electrical energy has crossed an associated electrical property threshold(s).

As used herein the term "a temperature of the apparatus" may refer to an actual temperature or another parameter that is related to said temperature, including a derivative thereof.

In embodiments, if either the temperature or the one or more electrical properties has crossed the respective temperature threshold or electrical property thresholds, then the electrical circuitry is configured to control one or more electrical properties of the of the electrical energy to reduce the temperature and/or electrical property that has exceeded the threshold.

By implementing the apparatus with a control system that controls the electrical energy when one or both of the electrical energy and a temperature of the apparatus crosses a threshold, it has been found that the apparatus can supply the highest power the apparatus is capable of (to ensure maximum treatment efficacy) whilst ensuring componentry of the apparatus are not damaged. In particular, it has been found that because the electrical load of a plant during treatment is highly variable (e.g. due to water content being vaporized), the electrical energy requires precise control to balance treatment efficacy with damage to componentry. It is a particular issue as the of the electrical energy is increased.

In embodiments, said control of the one or more electrical properties of the of the electrical energy to reduce the temperature and/or electrical property that has exceeded the threshold, may comprise reducing a value of said property without shutdown of the electrical energy through the transmission circuit. By implementing a non-shutdown control of the electrical energy through the transmission circuit, the electrical energy may continue to be supplied to treat a plant when said threshold(s) is crossed, and the temperature and or electrical property may be maintained as below said threshold.

In embodiments, the one or more electrical properties of the electrical energy that is controlled includes one or more of: an electrical potential over the applicator and return electrode; electrical current; power; phase; duty cycle; frequency; other electrical property (period of a waveform, full width at half maximum etc.). By controlling one or several of said properties, the electrical energy can be effectively controlled such that the temperature of the apparatus and the determined electrical property remain at a safe level whilst maximising treatment efficacy. For example, the property of the electrical energy that is controlled is the electrical potential over the applicator electrode and the return electrode by controlling the duty cycle of the electrical energy (e.g. by a waveform shaping system).

In embodiments, the electrical property of the electrical energy that is determined is based on one or more of the: an electrical potential over the applicator and return electrode; electrical current; power. By basing the control of the electrical energy on one of said properties, it has been found that the temperature of the apparatus and the determined electrical property remain at a safe level whilst maximising treatment efficacy. Typically, the electrical property of the electrical energy that is determined is different to an electrical property of the electrical energy that is controlled.

As used herein the term "based on" in respect of a property of the electrical energy may refer to the exact property or another property directly related thereto. For example, in reference to being based on an electrical potential over the applicator and return electrode, the property may comprise: the exact said electrical potential measured at these points; an electrical potential measured at alternative points in the transmission circuit but points over which the electrical potential varies such that it is representative of an electrical potential over the applicator and return electrode; an electrical potential measured at points on a primary side of a transformer but points over which the electrical potential varies such that it is representative of an electrical potential over the applicator and return electrode.

In embodiments, subsequent to the temperature crossing the temperature threshold and/or the one or more determined electrical properties crossing the associated electrical property threshold(s), the electrical property is controlled based on (including as a function based on) an overshoot of the temperature threshold and/or electrical property threshold(s). As used herein the term "function" may refer to any mathematical relationship with the overshoot (or a variable that is representative of the overshoot) as an input and a control variable, an amount by which the electrical property is controlled is based on, as the output. The relationship can include one or more or: an integral; a derivative; proportional, e.g. a linear relationship; a non-linear relationship, e.g. exponential; other. The function implements a control loop mechanism that feedback that to control the overshoot. By implementing a sophisticated function, when overshoot is determined it can be controlled in a manner such that the temperature of the apparatus and/or the determined electrical property remain at a safe level whilst maximising treatment efficacy. In embodiments, the function is implemented as a proportional-integral-derivative (PID) controller.

In embodiments, the electrical circuitry is configured to maintain the property of the electrical energy that is controlled at a target value. By implementing control to maximise the electrical property of the electrical energy to a target value, treatment efficacy may be optimised e.g. by applying the largest amount of electrical energy the apparatus is capable of. As an example, the electrical property that is controlled is based on an electrical potential over the applicator and return electrode and the target value is 20 kV.

In embodiments, the electrical circuitry is configured to maintain the electrical property that is controlled at a target value when the temperature or the one or more electrical property that is determined has not exceeded the associated temperature threshold or electrical property threshold(s). By controlling said property to the target value when the thresholds are not exceeded treatment efficacy may be optimised.

In embodiments, the target value is changed if the temperature or the or each electrical properties that are determined exceeds the associated temperature threshold or electrical property threshold(s). As an example, the electrical property is based on an electrical potential over the applicator and return electrode and the target value is 20 kV, if the temperature threshold or electrical property threshold is exceeded the target value is reduced to 18 kV.

In embodiments, the temperature and/or electrical property threshold(s) are selected based a property of the plant to be treated or user information. By implementing variable thresholds, the threshold can be set high if for example a large or difficult to treat plant requires treating or if a user has certain privileges for using the apparatus.

In embodiments, the electrical circuitry implements a first mode and a second mode and transitions between the first and second mode based on an input. The input may be a determined impedance between the applicator electrode and return electrode (e.g. including the impedance of the plant).

In embodiments in the first mode an electrical property is controlled and an electrical property is determined, and in the second mode an electrical property is controlled and an electrical property is determined, wherein either or both the electrical property is controlled and an electrical property is determined is different to that of the first mode. In an example, in the first mode the electrical potential between the applicator electrode and return electrode of the electrical energy is controlled and the electrical current is determined, and in the second mode the electrical current of the electrical energy is controlled and the potential between the applicator electrode and return electrode is determined.

In embodiments, the first mode and second mode the electrical property can be controlled to maintain the electrical property at the target value, including when the temperature or the one or more electrical property that is determined has not exceeded the associated temperature threshold or electrical property threshold(s).

By transitioning between the first and second mode based on impedance, the electrical energy is more appropriately controlled, since during initiation of treatment the impedance is high and the voltage is high and the current is low, hence the voltage is more appropriate to control, as treatment progresses the impedance decreases and the voltage is low and the current is high, hence the current is more appropriate to control.

In embodiments, the electrical energy has a repeating waveform with a frequency of at least 500 Hz or 1 kHz. When implementing the electrical energy with a repeating waveform that has high frequency, e.g. a frequency of above 50 Hz, it has been found that the electrical energy can be particularly difficult to control to maintain treatment efficacy whilst avoiding damage to the apparatus. A maximum frequency may be less than 1 MHz or 0.5 MHz. Accordingly, by implementing the electrical circuitry to control the electrical energy if either the temperature or the one or more electrical properties has crossed the respective temperature threshold or electrical property thresholds, these problems may be addressed.

In embodiments, the electrical circuitry implements a temperature sensing system to determine a temperature of the apparatus, e.g. of the electrical energy supply unit. In embodiments, the temperature sensing system is arranged to determine a temperature of one or more of: a waveform shaping system to impart a waveform in the electrical energy; a transformer; the applicator unit; the return unit; circuitry for driving the switching system; an AC to DC converter of the electrical energy supply unit; a filter of the electrical energy supply unit.

In embodiments, the temperature sensing system implements a temperature sensor to determine the temperature of the apparatus. In embodiments, a plurality of temperature sensors are implemented, with each arrange to determine the temperature of a separate part of the apparatus, and the electrical energy controlled if a temperature determined by any one of the temperature sensors has crossed the threshold. By implementing a plurality of temperature sensors the temperature of numerous components of the apparatus can be determined and if either crosses the temperature threshold, the electrical energy can be controlled. Such an implementation may be advantageous since the temperature at multiple points can be considered.

In embodiments, one or more of the: temperature threshold, the electrical property threshold(s) are variable. In embodiments, they are variable based on a property of the plant. By implementing variable thresholds, the threshold may be temporarily increased, for example to treat heavy plants. In embodiments, a plant detection system is arranged to determine a property of a plant to be treated, and the one or more of the: temperature threshold, the electrical property threshold(s) are determined based on the determined property of the plant. In embodiments, the temperature threshold is fixed and the electrical property threshold(s) are variable. By implementing a fixed temperature threshold, the temperature of the apparatus can be restricted to a safe maximum, whereas the electrical property threshold(s) may be optimised to the plant.

In embodiments, the apparatus includes a cooling system operable to reduce the temperature of the apparatus, wherein the cooling system is controlled to reduce the temperature if the temperature is determined to cross an initial temperature threshold. By implementing an initial temperature threshold the cooling system can be activated to delay the temperature reaching the higher temperature threshold, which if crossed the electrical energy is cut. The initial temperature threshold may be less that the temperature threshold or may be the temperature threshold.

In embodiments, the cooling system is implemented as a cooling fluid-based system, e.g. it comprises a fan to blow air over the apparatus or inlet and outlet vents to receive air from the atmosphere and a flow path to direct the air across the area to be cooled or it comprises a water cooled or other fluid based system. In embodiments, the cooling system is controlled as a function based on overshoot of the initial temperature threshold. The function may be as previously defined.

In embodiments, the electrical circuitry is configured to: determine if a temperature parameter, which is based on a temperature of the return electrode, has crossed a temperature threshold, and if the temperature parameter has crossed said temperature threshold, then to implement one or more of the following: control one or more electrical properties of the of the electrical energy to reduce or maintain the temperature of the return electrode; provide a notification to a user associated with changing a position of the return electrode, and; control a cooling system to implement cooling of the return electrode.

By implementing one or more of said options the temperature of the return electrode may be conveniently controlled to remain below a safe operating temperature, e.g. without shutdown of the electrical energy through the transmission circuit.

As used there the term "temperature parameter" may refer to any value that is numerically representative of temperature, and includes a temperature derivative, e.g. a temperature rate or a value numerically related thereto.

In embodiments, the cooling system comprises one or more of: a conductive system based on conductive heat transfer; a convective system based on convective heat transfer; a liquid cooled system. By implementing such an active cooling system the return electrode may be effectively cooled.

In embodiments, the notification is provided on a user interface, e.g. a light (including an LED) or graphical display.

In embodiments, control of an electrical property of the electrical energy includes transferring a portion of the electrical energy to an alternative return electrode. For a system that implements multiple return electrodes (which may be interconnected, or each have a dedicated electrical energy supply unit and transmission circuitry), the electrical energy may be fully or partially diverted away from an overheating return electrode, e.g. by means of an electrically operated switch to break the circuit, or other componentry (including a bank of electrical resistors) to attenuate the electrical energy through the return electrode. In this manner, an overheating return electrode may be allowed to cool down without stopping the electrical energy being supplied through the transmission circuit to a plant.

In embodiments, wherein said control one or more electrical properties of the of the electrical energy to reduce or maintain the temperature of the return electrode comprises controlling of one or more of the following electrical properties: an electrical potential over the return electrode; an electrical current through said transmission circuit; an electrical power through said transmission circuit; a frequency of the electrical energy; duty cycle of the electrical energy; a phase between of the electrical current and voltage; other electrical property (period of a waveform, full width at half maximum etc.), and; implementation of electrical damping in the transmission circuit.

By controlling one or several of said properties, the electrical energy can be effectively controlled such that the temperature of the apparatus and the determined electrical property remain at a safe level whilst maximising treatment efficacy. For example, the property of the electrical energy that is controlled is the electrical potential over the return electrode by controlling the duty cycle of the electrical energy (e.g. by a waveform shaping system). The property can be controlled without shutdown of the electrical energy through the transmission circuit.

In embodiments, subsequent to the temperature parameter crossing the temperature threshold, the electrical property is controlled based on (including as a function based on, as defined previously) an overshoot of the temperature threshold. In embodiments, said electrical quantity is controlled until the electrical circuitry determines that the temperature parameter is at or below the temperature threshold.

In embodiments, wherein following determination that the temperature is below or at the temperature threshold, the electrical circuitry is configured to reapply unaltered electrical energy through the transmission circuit. In embodiments, the electrical circuitry is configured following the determination of the condition of the temperature parameter crossing temperature threshold, to implement the following steps: Step A: wait a predetermined amount of time; Step B: determine if the temperature has crossed the temperature threshold; Step C: if the temperature has not crossed the temperature threshold then reapply unaltered electrical energy, if the temperature has still crossed the temperature threshold then loop to step A. In embodiments, said electrical quantity is altered for a predetermined amount of time after which unaltered electrical energy is reapplied. In embodiments, the unaltered electrical energy is reapplied instantaneously or is reapplied progressively over a period of time. In embodiments, the electrical circuitry is arranged to determine the condition of the temperature having crossed the temperature threshold during the progressive reapplication and if the temperature is determined as to have crossed the temperature threshold then to control the electrical energy through the transmission circuit to at least partially reduce the temperature based on said determined condition of the temperature parameter crossing the temperature threshold.

In embodiments, the return electrode is arranged for insertion into a portion of the ground in operative proximity to the applicator electrode.

In embodiments, the electrical circuitry implements a temperature sensing system to determine if the temperature has crossed said temperature threshold.

In embodiments, the temperature sensing system includes a plurality of temperature sensors, wherein for a determination of said temperature having crossed the temperature threshold a temperature from any one of said sensors is required to have crossed the temperature threshold.

Such an arrangement may be less susceptible to errors cause by failure of a sensor, or local variations in temperature on the return electrode.

The present disclosure provides use of the apparatus as disclosed herein for treatment of a plant, e.g. to kill or weaken the plant. The use may implement any feature of the preceding embodiment or another embodiment disclosed herein.

The present disclosure provides a method of treating a plant with electrical energy, the method comprising: controlling one or more electrical properties of the of the electrical energy if either a temperature or the one or more electrical properties is determined to have crossed a respective temperature threshold or electrical property threshold(s).

The present disclosure provides a method of treating a plant with electrical energy, the method comprising: applying electrical energy to the plant between an applicator electrode and return electrode; determining if a temperature parameter, which is based on a temperature of the return electrode, has crossed a temperature threshold, and; implementing one or more of the following: controlling one or more electrical properties of the electrical energy to reduce or maintain the temperature of the return electrode; providing a notification to a user associated with changing a position of the return electrode, and; controlling a cooling system to implement cooling of the return electrode.

The methods may implement any feature of the preceding embodiments or another embodiment disclosed herein. The present disclosure provides electrical circuitry or a computer program to implement the method of the preceding embodiment or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments.

Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
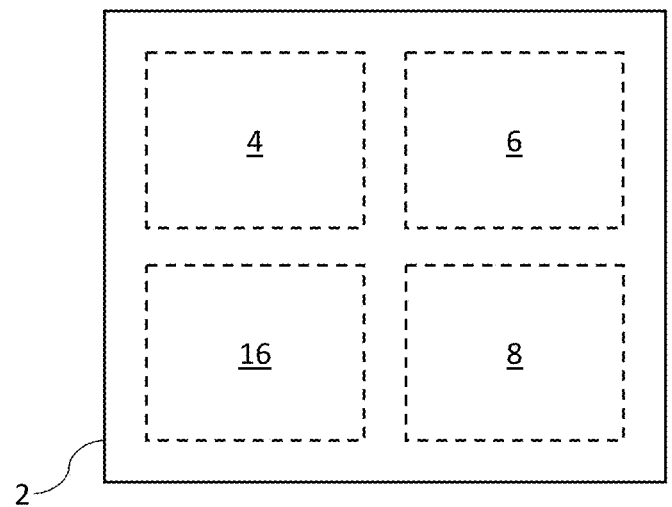
FIG. 1 is a block system diagram showing embodiment electrical apparatus to attenuate plant growth.

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein, the term "plant" or "weed" may refer to an undesired plant in a human controlled setting, such as a farm field, garden, lawn or park. A weed may refer to a multicellular photosynthetic eukaryote.

As used herein, the term "electrical arc" or "arc" may refer to an electrical breakdown of a gas that produces an electrical discharge. An arc is formed by an electrical current through a normally nonconductive medium such as air, and is characterized by a plasma, which may produce visible light. An arc discharge is characterized by a lower voltage than a glow discharge and relies on thermionic emission of electrons from the electrodes supporting the arc.

As used herein, the term "electrical energy" or "processed electrical energy" may refer to electrical energy supplied by an electrical energy supply unit and applied to the plant, e.g. through a transmission circuit. The electrical energy may comprise a periodic or aperiodic waveform, i.e. a waveform that continuously repeats with the repeating units therein having a constant or a varying period, e.g. a pulsed wave with a fixed duty cycle or a varying duty cycle. The shape of the repeating unit may be one of or a combination of one or more of the following forms: sine wave; saw-tooth wave; triangular wave; square wave; pulsed, e.g. DC pulsatile, half-wave rectified; other known form. The exact shape of the repeating unit may be an approximation of one of the aforesaid forms for reasons of distortion, e.g. overshoot/undershoot and the associated ringing and settle time. The repeating unit may be positive or negative or a combination thereof with respect to a selected reference value, which is typically earth or the 0 V of the voltage supply but may be another positive or negative voltage level. The frequency of the waveform may be above 25 Hz, 1 kHz, 10 kHz, 18 kHz or 25 kHz. The peak voltage may be of at least 1 kV, and may have a maximum of 70 kV. The electrical current may be of at least 10 mA rms, and may have a maximum of 250 A. With such a current and voltage applied though a transmission circuit that includes the plant, the water present plant may in effect be vaporized by the electrical energy, which can cause substantial cellular damage to the plant. This damage may in particular be exacerbated at high frequency in, inter alia, the Xylem and phloem. It will be understood that when referring to the voltage of the electrical energy, when the electrical energy has a waveform, the voltage is in respect of a suitable quantity, such as RMS, peak or other. The same applies for other electrical quantities such as power and current.

As used herein, the term "electrical energy supply unit" may refer to any unit or system, including a distributed system, for generating and/or conditioning electrical energy for supply to a transmission circuit which, in use, incorporates a plant.

As used herein, the term "electrical circuitry" or "electric circuitry" or "electronic circuitry" or "circuitry" or "control circuitry" may refer to, be part of, or include one or more of the following or other suitable hardware or software components: an Application Specific Integrated Circuit (ASIC); electronic/electrical circuit (e.g. passive electrical components, which may include combinations of transistors, transformers, resistors, capacitors); a processor (shared, dedicated, or group); a memory (shared, dedicated, or group), that may execute one or more software or firmware programs; a combinational logic circuit. The electrical circuitry may be centralised on the apparatus or distributed, including distributed on board the apparatus and/or on one or more components in communication with the apparatus, e.g. as part of the system. The component may include one or more of a: networked-based computer (e.g. a remote server); cloud-based computer; peripheral device. The circuitry may be implemented in, or functions associated with the circuitry may be implemented by, one or more software or firmware modules. The circuitry may include logic, at least partially operable in hardware.

As used herein, the term "processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic. The processor may have various arrangements corresponding to those discussed for the circuitry, e.g. on-board and/or off board the apparatus as part of the system.

As used herein, the term "computer readable medium/media" or "data storage" may include conventional non-transient memory, for example one or more of: random access memory (RAM); a CD-ROM; a hard drive; a solid state drive; a flash drive; a memory card; a DVD-ROM; a floppy disk; an optical drive. The memory may have various arrangements corresponding to those discussed for the circuitry/processor.

As used herein, the term "information carrying medium" may include one or more arrangements for storage of information on any suitable medium. Examples include: data storage as defined herein; a Radio Frequency Identification (RFID) transponder; codes encoding information, such as optical (e.g. a bar code or QR code) or mechanically read codes (e.g. a configuration of the absence or presents of cut-outs to encode a bit, through which pins or a reader may be inserted).

As used herein, the term "applicator unit" or "applicator" may refer to any suitable device for applying electrical energy to a plant, including by direct contact with the plant and/or spark transmission. In particular, an applicator electrode of the applicator unit may be arranged for direct contact with a portion of the plant above the ground.

As used herein, the term "earth unit" or "return unit" may refer to any suitable device for receiving electrical energy from a circuit including the plant and optionally the ground to complete a transmission circuit, including by direct contact with the plant and/or spark transmission. A return electrode of the return unit may be inserted into the ground, or arranged to rest on/be dragged along the surface of the ground, or otherwise electrically connected to the ground to receive the electrical energy transmitted through the above ground portion of the plant, and the ground surrounding the plan as part of the transmission circuit.

As used herein, the term "apparatus" or "electrical apparatus" may refer to any combination of one or more of the following for treatment of a plant: electrical energy supply unit; electrical circuitry; applicator unit; applicator electrode; return unit; return electrode; transmission circuit.

Figure 2:
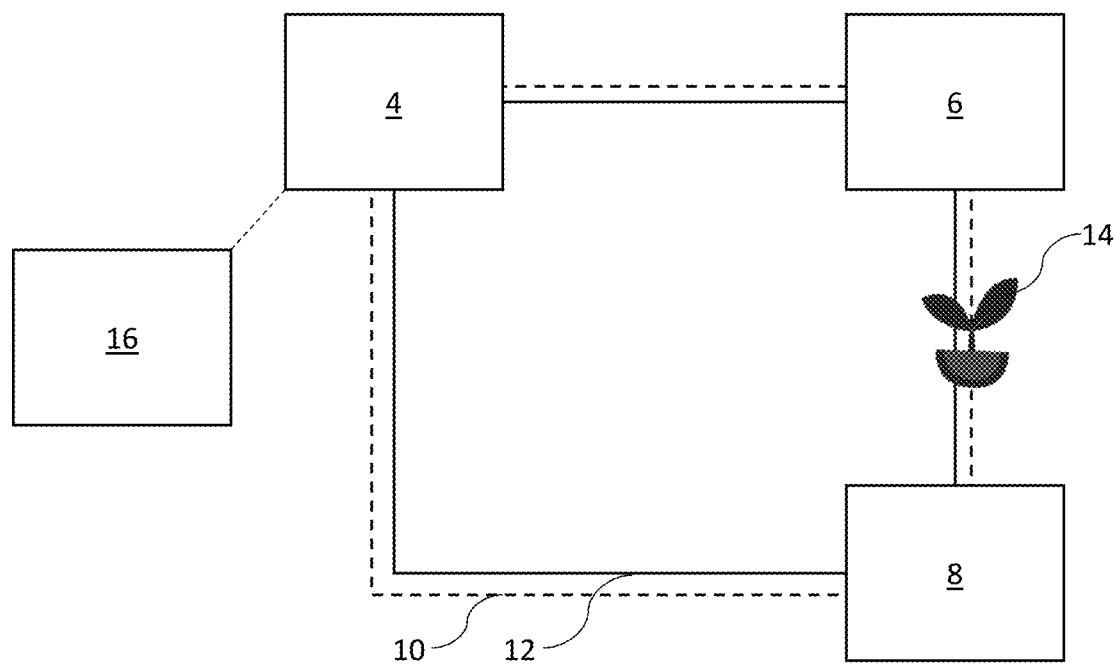
FIG. 2 is a schematic diagram showing the apparatus of FIG. 1.

Referring to FIGS. 1 and 2, apparatus 2 to attenuate plant growth, comprises an electrical energy supply unit 4, an applicator unit 6 and a return unit 8. The electrical energy supply unit supplies electrical energy 10 around a transmission circuit 12, which includes the applicator unit 6, return unit 8.

The transmission circuit 12, when treating a plant, may include said plant 14. It will be understood that depending on the operative arrangement of the applicator unit and return unit, a return path of the transmission circuit 12 optionally includes other matter, such as proximal earth and fluid (e.g. air and moisture) to the plant.

The apparatus 2 includes electrical circuitry 16, which may implement a range of control operations. In embodiments, said circuitry 16 is operable to control the electrical energy supplied by the electrical energy supply unit 4 through the transmission circuit 12, as will be discussed.

Figure 3:
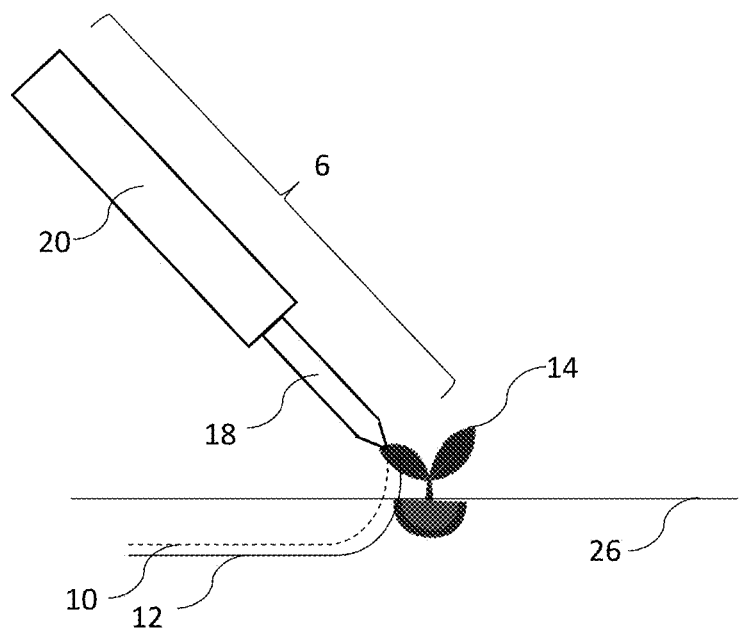
FIG. 3 is a schematic diagram showing an applicator unit of the apparatus of FIG. 1.

Referring to FIG. 3, the applicator unit 6 is adapted to receive electrical energy 10 from the electrical energy supply unit 4 and to transmit said electrical energy 10 to the plant 14 (shown in FIG. 2). The applicator unit 6 comprises an applicator electrode 18. The applicator electrode 18 is electrically connected to the electrical energy supply unit 4 by an electrically conductive material, e.g. by wiring or solid material, which forms part of the transmission circuit 12.

The applicator electrode 18 is adapted to apply the electrical energy 10 to the plant 14. In embodiments, the applicator electrode 18 is arranged for direct contact with the plant 14. As used herein "direct contact" may refer to physical contact between the plant and electrode, and may be achieved by operatively arranging the electrode to be exposed from a body of the applicator. The applicator electrode 18 comprises an electrically conductive material e.g. copper, zinc, bronze, brass, aluminium or steel.

The geometric configuration of the applicator electrode 18 may be selected depending on the intended treatment regimen, for example: a rod for sweeping through areas of dense plants; a hook-shape for separating plants.

The applicator unit 6 comprises body 20 to carry the applicator electrode 18. The body 20 may be adapted to be held by a user or fixed to a chassis depending on the particular configuration of the apparatus 2 (e.g. adapted for domestic or agricultural implementation respectively).

In embodiments, which are not illustrated, the applicator electrode is implemented as a plurality of electrodes, e.g. for treatment of multiple plants at a given moment.

Figure 4:
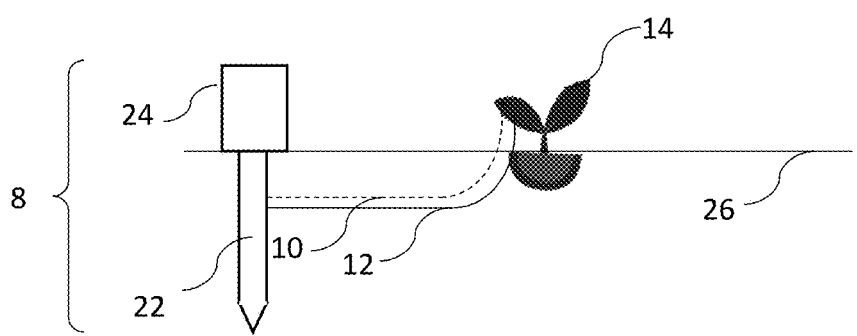
FIG. 4 is a schematic diagram showing an return unit of the apparatus of FIG. 1.

Referring to FIG. 4, the return unit 8 is adapted to receive electrical energy 10 from the applicator unit 6 via the plant 14 (shown in FIG. 2). The return electrode 22 is electrically connected to the electrical energy supply unit 4 by an electrically conductive material, e.g. by wiring or solid material, which forms part of the transmission circuit 12.

The return electrode 22 is adapted to provide a return for electrical energy 10 via the plant 14 to complete the transmission circuit 12. In embodiments, the return electrode 22 is arranged for direct contact with the ground 26 (shown in FIG. 4). As used herein "direct contact" may refer to physical contact between the ground and electrode, and may be achieved by operatively arranging the electrode to be exposed from a body of the return unit. The return electrode 18 comprises an electrically conductive material e.g. copper, zinc, bronze, brass, aluminium or steel.

The geometric configuration of the return electrode may be selected depending on the intended implementation of the apparatus, for example: an implement for insertion into the ground (e.g. for apparatus that in use remains in a generally fixed position), such as a rod or spike; an implement for movement along the ground (e.g. for apparatus that in use has a variable position), such as a rod or spike), such as a flat plate or roller, and; a combination of the aforesaid implementations.

The return unit 8 comprises body 24 to carry the return electrode 22. The body 24 may be adapted to be held by a user or fixed to a chassis depending on the particular configuration of the apparatus 2 (e.g. adapted for domestic or agricultural implementation respectively).

In embodiments, which are not illustrated, the return electrode is implemented as a plurality of electrodes, e.g. for treatment of multiple plants at a given moment.

Generally, the apparatus 2 is arranged with the return electrode 22 arranged in operative proximity to the applicator electrode 18. Operative proximity may refer to a geometric arrangement to limit the path of the electrical energy 10 through the ground 26, which may advantageous for reasons of efficient and/or electrical safety.

Figure 5:
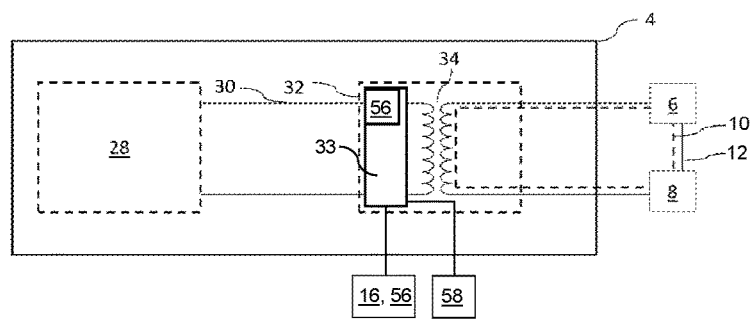
FIG. 5 is a schematic diagram showing an electrical energy supply unit of the apparatus of FIG. 1.

Referring to FIG. 5, the electrical energy supply unit 4 is arranged to supply processed electrical energy 10 to the transmission circuit 12. The electrical energy supply unit 4 includes a power supply 28 for supply of supply electrical energy 30. The power supply 28 may be implemented as one or more of the following: a battery; a fuel cell; a generator, including an internal combustion engine powered generator, which may be implemented with a dedicated internal combustion engine or a shared internal combustion engine for other agricultural equipment, e.g. a tractor, which is arranged to drive the generator; other like. The power supply 28 provides supply electrical energy 30, in alternating current (AC) or direct current (DC), including pulsated or with other form with a fixed quantity, e.g. in one or more or power; voltage; current; frequency; phase.

The electrical energy supply unit 4 includes an electrical energy processing unit 32 for processing of the supply electrical energy 30 to the electrical energy 10. The electrical energy processing unit 32 includes an electrical transformer 34 with appropriately configured windings, e.g. for step-up or step down, depending on the configuration of the supply electrical energy 30 and desired output of the electrical energy 10.

In variant embodiments, which are not illustrated, alternative step-up or step-down converters to the transformer are implemented, e.g. a boost converter, other amplifier topology. A step-up or step-down converter may also be obviated if the electrical energy is supplied in the desired form. For example, the transformer may be obviated if the electrical energy is supplied in the desired form by: the power supply or the power supply is replaced by an input unit to receive a commercial or domestic electrical supply (a mains supply).

Where the power supply 28 provides supply electrical energy 30 as AC (e.g. the power supply 28 is arranged as a generator) or the power supply 28 is omitted and there is an input unit comprising a circuit for receiving an electrical supply (e.g. from a mains electrical supply or other electrical supply) the electrical energy processing unit 32 includes a AC to DC converter (not illustrated) arranged to provide a DC current to a waveform shaping system, which may be referred to as a switching system 33. Where the power supply 28 provides supply electrical energy 30 as DC, e.g. a battery, an AC to DC converter is obviously obviated.

The electrical energy processing unit 32 includes a switching system 33 to generate the desired wave form (e.g. in shape and/or frequency) in the electrical energy supplied to the electrical transformer 34. The switching system 33 is implemented as an electrically operated switch (e.g. a MOS-FET, relay, other transistor).

In variant embodiments of the electrical energy supply unit, which are not illustrated, the power supply (or electrical supply to the input unit) supplies electrical energy of the desired configuration. Accordingly the electrical energy processing unit is obviated. In other embodiments, the power supply (or input unit) supplies electrical energy which only needs step-up or step-down, in which case the switching system is obviated but the transformer is maintained. In other examples the switching system is present but the step-up or step-down converter is omitted.

The electrical circuitry 16 implements a control algorithm to control the electrical energy 10, through the transmission circuit 12. Said control may implement control of one or more of the following electrical quantities: electrical potential between the applicator and return electrodes; electrical current control; frequency or duty control; phase.

In the embodiment of FIG. 5, the electrical circuitry 16 controls the switching system 33 to implement control of the voltage and current by pulse width modulation. The frequency is controlled by the rate of switching. In variant embodiments, which are not illustrated the electrical quantities can be controlled by other means, e.g. including by changing the taping of the electrical transformer (on the primary and/or secondary coil), which may be implemented as a variable transformer, by introducing capacitance and/or inductance in the transmission circuit.

Figure 6:
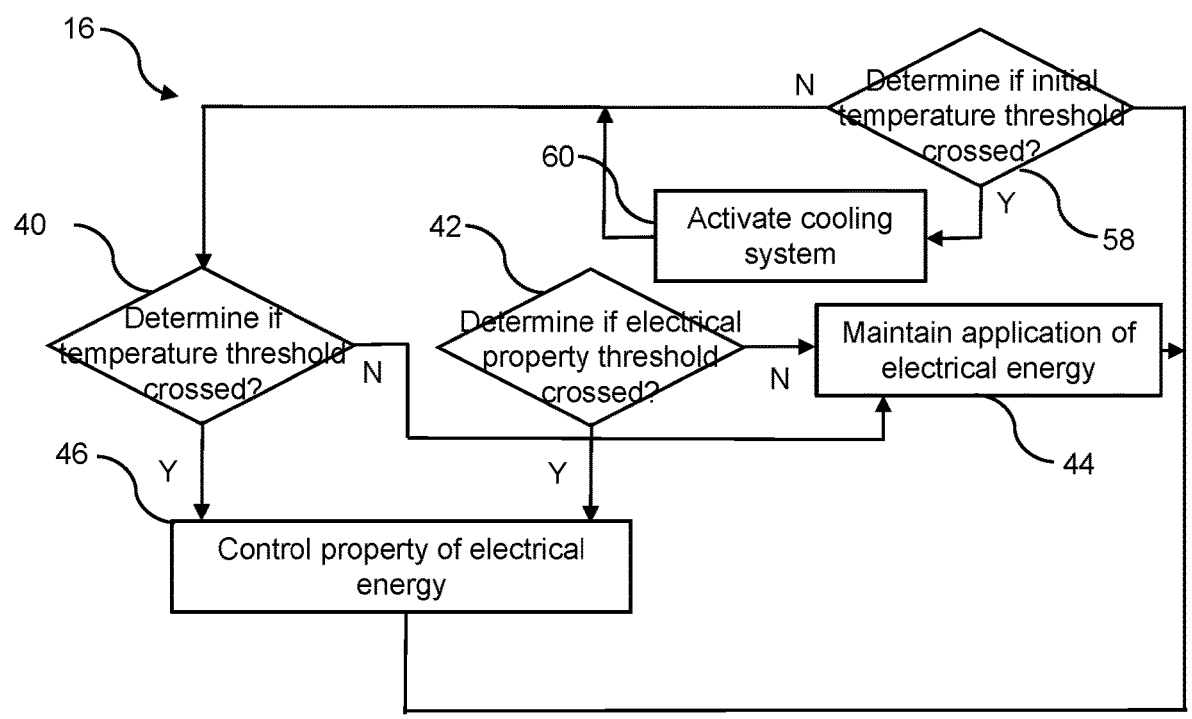
FIG. 6 is a flow chart showing an embodiment process for controlling electrical energy supplied to a plant by the apparatus of FIG. 1.

Referring to FIG. 6, the electrical circuitry 16 implements a control algorithm to control the electrical energy 10 in the transmission circuit 12. The control algorithm is implemented to: at block 40 to determine if a temperature of the apparatus has crossed a temperature threshold, and; at block 42 to determine if one or more electrical properties of the electrical energy 10 has crossed an associated electrical property threshold(s). Whilst blocks 40 and 42 are illustrated as being executed in parallel, it will be understood that they may either be executed concurrently or successively, e.g. with the same or a different clock cycle of a processor.

If neither thresholds of blocks 40 and 42 are exceeded, then block 44 is executed and the electrical energy 10 through the transmission circuit 12 is maintained.

If one or both thresholds of blocks 40 and 42 are exceeded, then block 46 is executed and one or more properties of the electrical energy 10 through the transmission circuit 12 is controlled to reduce the temperature and/or electrical property that has exceeded the threshold.

In variant embodiments, which are not illustrated, the control algorithm implements only one of the blocks 40 or 42, e.g. only the temperature is determined as having crossed the threshold or only the one or more electrical properties of the electrical energy are determined as crossing the threshold(s), and the block 46 is then executed.

Example 1

In a first example, at block 46, the electrical potential over the applicator electrode 18 and the return electrode 22 is controlled, by a duty cycle of the electrical energy with the waveform shaping system 33.

In variant embodiments that are not illustrated, the electrical property of the electrical energy that is controlled at block 46 can be one or more of: an electrical potential over the applicator and return electrode; electrical current; power; phase; frequency; other electrical property (period of a waveform, full width at half maximum etc.).

In the first example at block 42 the electrical property of the electrical energy that is determined is based on the electrical current of the electrical energy 10.

In variant embodiments that are not illustrated, the electrical property of the electrical energy that is determined is based on the one or more of: an electrical potential over the applicator electrode and return electrode; electrical power;

other electrical property (e.g. full width at half maximum of the waveform or an amount of electrical noise etc).

The electrical circuitry 16 can implement various circuitry (not illustrated) to determine the electrical property of the electrical energy, which can include one or more of: an ammeter; voltmeter; oscilloscope; potential divider; analogue input on a processor; or other sensor device to measure one of the mentioned electrical properties of the electrical energy.

Figure 7:
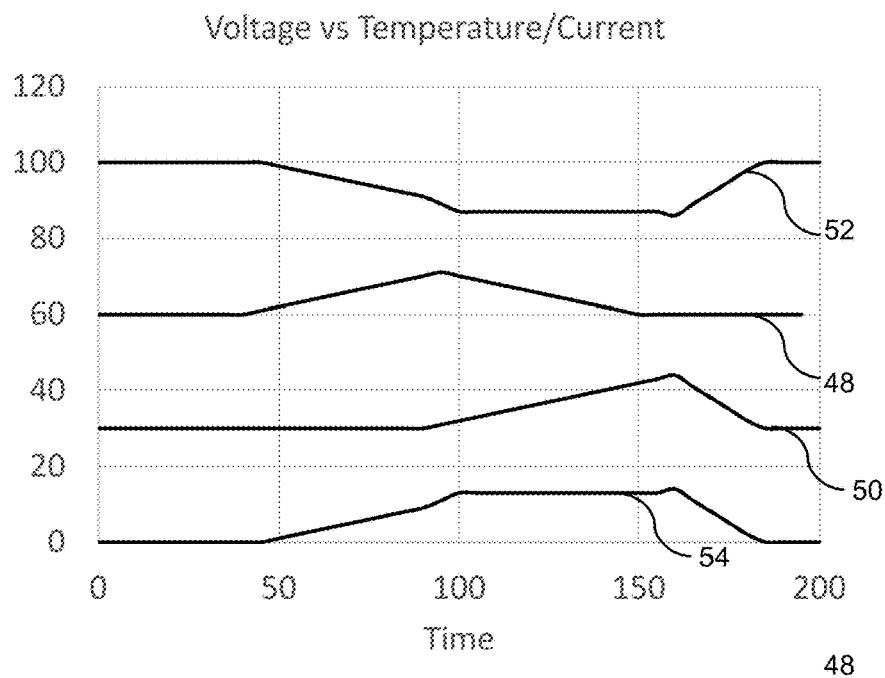
FIGS. 7 and 8 are graphical plots showing an example of the process of FIG. 6.

Referring to FIG. 7, the processes of blocks 40-46 are illustrated by way of example, wherein the temperature is line 48, current is line 50 and voltage is line 52.

It can be seen that at a time of about 50 the temperate 48 exceeds a threshold of 60 at which point the voltage 52 is reduced from 100. At a time of about 95 the temperature 48 begins to drop due to the reduced voltage 52, and after this time the voltage 52 is maintained as constant of about 88 up to a time of about 155. At a time of 150 the temperature 48 drops to below the threshold of 60.

At a time of about 155 the current 50 exceeds a threshold of 45 at which point the voltage 52 is reduced from about 88 to 85. Immediately after the current 50 begins to drop. At a time of 160 the current 50 drops to below the threshold of 45 and the voltage 52 is increased back to 100.

The electrical property (which in the illustrative first example is the electrical potential over the applicator electrode 18 and the return electrode 22) is controlled as a function based on: an overshoot of the temperature over the temperature threshold; and/or an overshoot of the electrical property threshold(s) (which in the illustrative example is the current).

The function is implemented as proportional-integral-derivative (PID) control, that includes proportional, integral and differential functions of the overshoot used to determine an error, which is illustrated as line 54 in FIG. 7. It can be seen in FIG. 7 that the error 54 on the combined overshoot of the temperature and current. The error is used to determine an amount of control (typically a reduction) in the electrical property (which in the illustrative example is the electrical potential over the applicator electrode 18 and the return electrode 22).

It can be seen in FIG. 7 that, due to thermal inertial (e.g. heat sinks on the wave shaping system or the transformer), the temperature falls at much lower rate than for the current. It will be understood that the function is suitably calibrated to account for this greater lag.

In variant embodiments, which are not illustrated, the PID control can be implemented as any one or more of proportional, integral and differential functions; the function can comprise any mathematical relationship with the overshoot (or a variable that is representative of the overshoot) as an input and a control variable, an amount by which the electrical property is controlled is based on, as the output.

Referring to FIG. 7, the electrical potential over the applicator electrode 18 and the return electrode 22, which is represented by voltage line 52 is maintained at a target value of 100 when the temperature and current thresholds are not exceeded. It can be seen that when one or both thresholds is exceeded control of the voltage is implemented, which reduces the voltage from that of the target.

In variant embodiments, which are not illustrated, the target value of the electrical property is decreased if the temperature or one or more electrical property that is determined exceeds the associated temperature threshold or electrical property threshold(s). As an example, the target voltage 52 of 100 in FIG. 7 may be decreased to 80 if the temperature repetitively exceeds 60 and/or the current repetitively exceeds 45.

Second Example

In a second example, the control algorithm that is implemented by the electrical circuitry 16 is the same as for the first example, however the output and input are different. Referring back to FIG. 6: at block 46, the electrical current through of the electrical energy 10 is controlled, by a duty cycle of the electrical energy with the waveform shaping system 33, and at block 42 the electrical property of the electrical energy that is determined is based on the electrical potential over the applicator electrode 18 and the return electrode 22.

Figure 8:
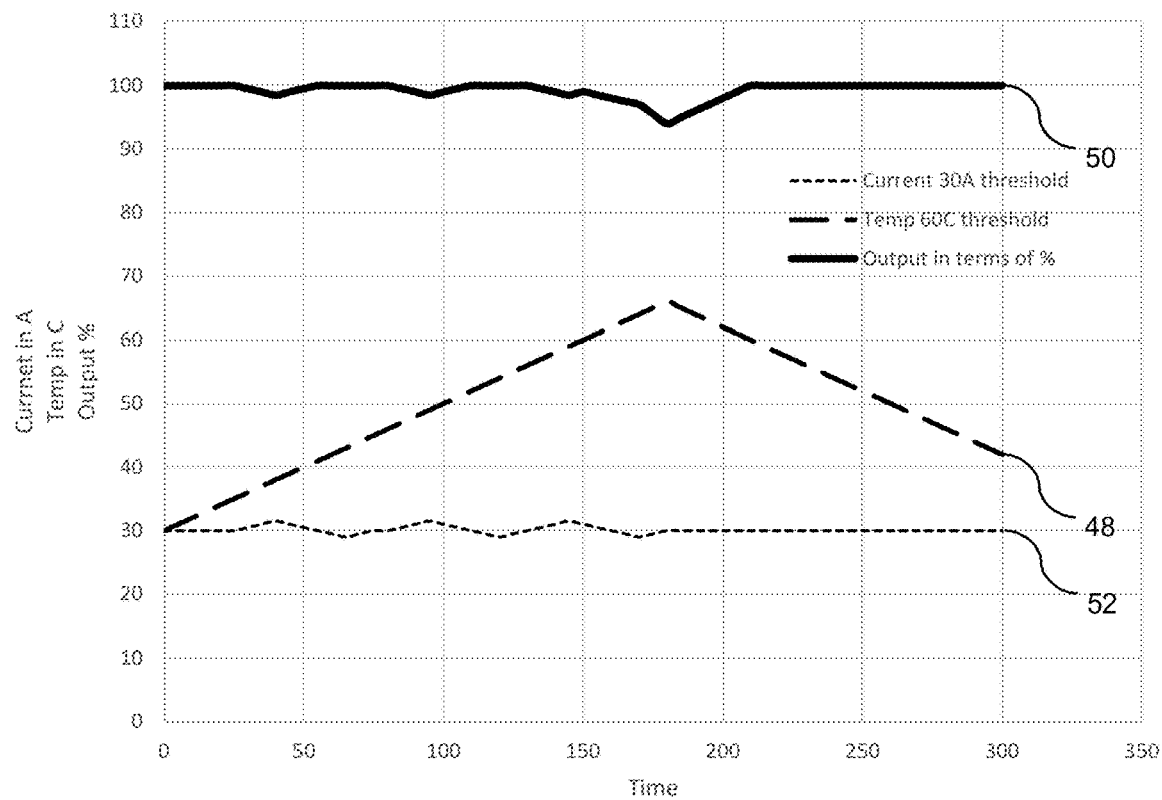

Referring to FIG. 8, the processes of blocks 40-46 are illustrated by way of example, wherein the temperature is line 48, current is line 50 and voltage is line 52.

It can be seen that at a time of about 150 the temperate 48 exceeds a threshold of 60 at which point the current 50 is reduced from about 100. At a time of about 160 the temperature 48 begins to drop due to the reduced current 50, and after this time the current 50 is increased from about 94 back to about 100 at a time of about 220. At a time of about 220 the temperature 48 drops to below the threshold of 60.

The current (or voltage in example 1) may in general be reduced until the temperature is seen to reduce, at which point it may be maintained or increased.

At a time of about 30 the voltage 52 exceeds a threshold of 30 at which point the current 50 is reduced from about 100 to 98 at a time of about 40. Immediately after the voltage 52 begins to drop. At a time of 50 the voltage 52 drops to below the threshold of 30 and the current 50 is increased back to 100.

The electrical property (which in the illustrative second example is the electrical current through the transmission circuit 12) is controlled as a function based on: an overshoot of the temperature over the temperature threshold; and/or an overshoot of the electrical property threshold(s) (which in the illustrative example is the electrical potential over the applicator electrode 18 and the return electrode 22).

The function is implemented as proportional-integral-derivative (PID) control, that includes proportional, integral and differential functions of the overshoot used to determine an error.

Combining First and Second Example

The first and second examples can be combined, such that in some instances the voltage is controlled according to the first example and in other instances the current is controlled according to the second example.

In particular the electrical circuitry 16 can determine an electrical impedance between the applicator electrode 18 and return electrode 22 (e.g. an electrical impedance of the plant 14) using the previously discussed circuitry that is implemented to determine the electrical property of the electrical energy (e.g. the current and voltage). Based on the determined electrical impedance the electrical circuitry can transition between the first and second examples. The first example is preferable when treatment is initiated since the voltage is high and the current is low and the electrical impedance is high. The second example is preferable when treatment has progressed since the current is high and the voltage is low and the electrical impedance is low.

In variant embodiments, which are not illustrated, the electrical circuitry alternatively transitions between the first and second example, e.g.: a user may manually change between the first example and second example.

In variant embodiments, which are not illustrated, in the first example, the voltage is controlled to be maintained at a target voltage (and no temperature or electrical property thresholds are determined) and in the second example, the current is controlled to be maintained at a target current (and no temperature or electrical property thresholds are determined), and the first example and second example are transitioned between based on impedance.

In variant embodiments, which are not illustrated, the first and second example can determine and control other electrical properties as disclosed herein.

Temperature Sensing System

Referring to FIG. 5, the electrical circuitry 16 implements a temperature sensing system 56 to determine a temperature of the waveform shaping system 33 of the electrical energy supply unit 4. The temperature sensing system 56 includes a temperature sensor (e.g. a thermocouple or thermistor) to determine the temperature of the apparatus. The temperature of the apparatus is used at block 40 of FIG. 6 to demine if the temperature threshold has been crossed.

In variant embodiments, which are not illustrated, the temperature sensing system is arranged to determine a temperature of one or more of: the transformer; the applicator unit; the return unit; circuitry for driving the switching system; an AC to DC converter of the electrical energy supply unit; a filter of the electrical energy supply unit; other component of the apparatus. The temperature Sensing system can also determine temperature by resistance (e.g. of a resistor of a circuit of the apparatus that has a variable resistance based on temperature) so a dedicated temperature sensor can be omitted.

In variant embodiments, which are not illustrated, the temperature sensor is arranged as a plurality of temperature sensors, each arrange to determine the temperature at one or more of the previously mentioned components of the apparatus. The electrical circuitry can implement OR logic, such that if the temperature of at least one of the plurality temperature sensors crosses the temperature threshold then the electrical energy is controlled at block 46.

Cooling System

Referring to FIG. 5, the apparatus 2 includes a cooling system 58 operable to reduce the temperature of the component of the apparatus 2 for which the temperature is determined. The cooling system 58 is a fluid-based system, e.g. it comprises a fan to blow air over the apparatus or it comprises a water cooled or other fluid based system.

Referring to FIG. 6 at block 60 it is determined if the temperature has cross an initial temperature threshold (which is less than the temperature threshold of block 40). If the initial temperature threshold has been crossed, then the cooling system 58 is activated to delay the temperature reaching the higher temperature threshold of block 40.

An amount of cooling provided by the cooling system 58 (e.g. a fluid flow provided by the fan or a water pump) is controlled as a function based on an overshoot of the initial temperature threshold. The function may be as previously defined for the temperature threshold and electrical property threshold.

In variant embodiments, which are not illustrated: the cooling system is activated proportionally to the temperature, hence there is no initial temperature threshold; the cooling system is omitted.

User Rights

Figure 9:
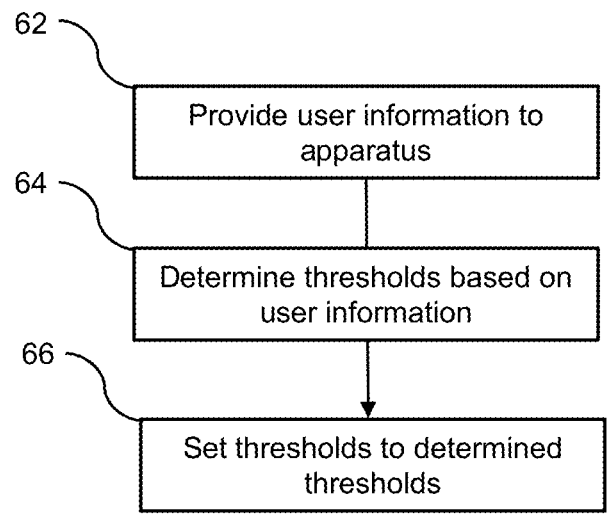
FIG. 9 is a flow diagram for setting a threshold of the apparatus of FIG. 1.

Referring to FIG. 9, the electrical circuitry 16 implements an control algorithm for setting the: temperature threshold and/or the electrical property threshold(s).

Typically the temperature threshold is set to a fixed amount which is based on a safe operating temperature of the componentry however in some embodiments it may be variable.

At block 62 information is provided to the circuitry 16.

In a first example, the information comprises user information relating to the privileges of the user and the apparatus 2. The user information can comprise a user subscription information that provides information about whether the user has paid for high or low performance apparatus.

In a second example, the user information can comprise user authorisation information that provides information about whether the user has high or low performance based on their level of skill.

The user information can be input via an authentication system (not illustrated) that comprises one or more of: pin code or password entry on a user interface; an identifier of the apparatus being provided over a communication network to a server system that comprises user rights associated with the identifier.

In variant embodiments, which are not illustrated, the information comprises information related to a plant to be treated, e.g. a geometry of mass of the plant or a level of difficulty to treat can be estimated from a detection system that comprises a camera system or can be manually entered.

At block 64 the temperature threshold and/or the electrical property threshold(s) are determined based on the information provided at block 62. In the first example for a high performance subscription, the thresholds can be set to high and for a low performance subscription the thresholds can be set comparatively low. A look up table can relate values for the threshold and the user information.

In variant embodiments, which are not illustrated, where information comprises information related to a plant to be treated, the thresholds can be set to high if a large or difficult to treat plant is determined.

At block 66 the temperature threshold and/or the electrical property threshold(s) are set based on the sections at block 64.

Figure 10:
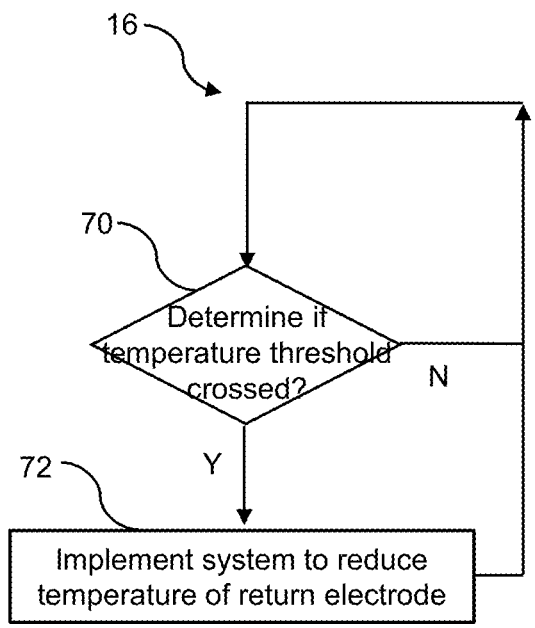
FIG. 10 is a flow chart showing an embodiment process for controlling a temperature of a return electrode of the apparatus of FIG. 1.

Referring to FIG. 10, a variant of the preceding embodiments is disclosed, in which the electrical circuitry 16 is configured at block 70 to determine if a temperature parameter, which is based on a temperature of the return electrode 22, has crossed a temperature threshold, and if the temperature parameter has crossed said temperature threshold, then to implement at block 72 one or more systems to reduce the temperature of the return electrode 22.

The system to reduce the temperature of the return electrode 22 can comprise one or more of the following: control one or more electrical properties of the of the electrical energy 10 (examples of which were provided for the previous embodiments) to reduce or maintain the temperature of the return electrode; provide a notification to a user associated with changing a position of the return electrode, and; control a cooling system to implement cooling of the return electrode.

The notification to a user can be provided on a user interface (not illustrated), examples of which include: a light (including an LED), which can be implemented to indicate overheating, e.g. by an activation or colour change or other indication; a graphical display that can provide a message, which may be part of the apparatus 2 or an electrical device (not illustrated) in communication with the apparatus 2, e.g.

a mobile phone, and; other suitable system. The message provide on the user interface may be instructions move the return electrode 22 to a different position in the ground which has not been heated by the electrical energy 10.

The cooling system (not illustrated) can include one or more of: a conductive system based on conductive heat transfer, e.g. a heat conductor may be moved to contact the return electrode; a convective system based on convective heat transfer, e.g. a fan driven system; a liquid cooled system, e.g. a water cooling system, and; other suitable system. Said system may be operated in response to overheating.

The control of the electrical property of the electrical energy 10 can include transferring a portion of the electrical energy 10 to an alternative return electrode 22. For apparatus 2 that implements multiple return electrodes 22 (which may be interconnected, or each have a dedicated electrical energy 10 supply unit and transmission circuitry), the electrical energy 10 may be fully or partially diverted away from an overheating return electrode 22, e.g. by means of an electrically operated switch to break the circuit, or other componentry (including a bank of electrical resistors, which are switched in series with the overheating return electrode 22) to attenuate the electrical energy 10 through the return electrode 22.

Subsequent to the temperature parameter crossing the temperature threshold, the control of one or more electrical properties of the electrical energy 10 can be implemented as a function of an amount of overshoot of the temperature threshold, e.g. via PID control, as discussed previously or with another suitable control implementation.

The one or more electrical properties of the electric energy 10 can be controlled in this manner until the electrical circuitry 16 determines that the temperature parameter is at or is below the temperature threshold.

The electrical circuitry 16 implements a temperature sensing system (not illustrated) to determine if the temperature of the return electrode 22 has crossed said temperature threshold. Examples of a sensing system include: a thermocouple; a thermopile; a resistive element in the transmission circuit 12 that changes its electrical resistance based on its temperature, wherein said electrical resistance is measured, e.g. by an electrical potential over the resistive element, to determine the temperature; and infrared sensor and; other suitable system. The temperature sensing system can be implemented as a plurality of temperature sensors, wherein for a determination of said temperature parameter having crossed the temperature threshold a temperature from any one of said sensors is required to have crossed the temperature threshold.

The temperature sensing system provides a signal to a processor (not illustrated) of the electrical circuitry 16 that is implemented to determine if the temperature parameter has been crossed, and if crossed the processor can provide a signal for the various previously described control of the temperature of the return electrode 22.

It will be appreciated that any of the disclosed methods (or corresponding apparatuses, programs, data carriers, etc.) may be carried out by either a host or client, depending on the specific implementation (i.e. the disclosed methods/ apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Electrical apparatus
  4 Electrical energy supply unit
    28 Power supply
    32 Electrical energy processing unit
      33 Wave form shaping/Switching system
      34 Electrical transformer
  6 Applicator unit
    18 Applicator electrode
    20 Body
  8 Return unit
    22 Return electrode
    24 Body
  10 Electrical energy
  30 Supply electrical energy
  12 Transmission circuit
  16 Electrical circuitry
14 Plant
26 Ground

The invention claimed is:

1. Electrical apparatus to kill a plant or at least attenuate plant growth, the apparatus comprising:
an electrical energy supply unit;
an applicator unit comprising an applicator electrode;
a return unit comprising a return electrode;
electrical circuitry;
the electrical energy supply unit arranged to apply electrical energy through a transmission circuit comprising the applicator electrode, a plant, and the return electrode,
the electrical circuitry configured to:
determine if a temperature of the apparatus has crossed a temperature threshold, and
determine if a first electrical property of the electrical energy has crossed a first threshold;
and, if either the temperature or the first electrical property has crossed the temperature threshold or the first threshold, respectively, the electrical circuitry is configured to control the first electrical property or another electrical property of the electrical energy without shutdown of the electrical energy through the transmission circuit to reduce the temperature and/or the first electrical property that has exceeded the temperature threshold or the first threshold, respectively.

2. The apparatus of claim 1, wherein the first electrical property of the electrical energy that is controlled is an electrical potential over the applicator and return electrode; an electrical current; a power; a phase; a duty cycle; or a frequency.

3. The apparatus of claim 1, wherein the first electrical property of the electrical energy that is determined is based on one or more of: an electrical potential over the applicator and return electrode; an electrical current; and a power.

4. The apparatus of claim 1, wherein the electrical circuitry is configured so that subsequent to the temperature crossing the temperature threshold and/or the first electrical property crossing the first threshold, the first electrical property or another electrical property is controlled as based on an overshoot of the temperature threshold or the first threshold.

5. The apparatus of claim 1, wherein the electrical circuitry is configured to maintain the first electrical property or another electrical property that is controlled at a target value when the temperature or the first electrical property that is determined has not exceeded the temperature threshold or the first threshold, respectively.

6. The apparatus of claim 5, wherein the electrical circuitry is configured with the target value changed if the temperature or the first electrical property that is determined exceeds the temperature threshold or the first threshold, respectively.

7. The apparatus of claim 1, wherein the electrical circuitry is configured to implement a first mode and a second mode and transitions between the first and second mode based on an input,
wherein, in the first mode, the first electrical property is controlled and the first electrical property is determined,
and, in the second mode, a second electrical property is controlled and a third electrical property is determined, wherein either or both the second electrical property that is controlled and the third electrical property that is determined is different to that of the first mode.

8. The apparatus of claim 1, wherein the electrical energy has a repeating waveform with a frequency of at least 1 kHz.

9. The apparatus of claim 1, wherein the electrical circuitry is configured to implement a temperature sensing system arranged to determine the temperature of one or more of: a waveform shaping system of the electrical energy supply unit to impart a waveform in the electrical energy; a transformer of the electrical energy supply unit to provide the electrical energy; circuitry for driving the waveform shaping system; an AC to DC converter of the electrical energy supply unit; a filter of the electrical energy supply unit; the applicator unit; the return unit.

10. The apparatus of claim 1, wherein the electrical circuitry is configured with one or more of: the temperature threshold; the first threshold based one or more of: a property of the plant to be treated; and a user information.

11. The apparatus of claim 1, wherein the apparatus includes a cooling system configured to reduce the temperature of the apparatus,
wherein the cooling system is controlled to reduce the temperature if the temperature is determined to cross an initial temperature threshold.

12. Use of the apparatus of claim 1 for treatment of the plant.

13. A method of treating a plant with electrical energy, the method comprising:
determining if a temperature of the apparatus has crossed a temperature threshold;
determining if a first electrical property of the electrical energy has crossed a first threshold, and;
controlling the first electrical property or another electrical property of the electrical energy without shutdown of the electrical energy if either the temperature or the first electrical property is determined to have crossed the temperature threshold or the first threshold, respectively.

14. Electrical circuitry to implement the method of claim 13.

15. A computer program to implement the method of claim 13.

16. An electrical apparatus to kill a plant or at least attenuate plant growth, the apparatus comprising:
an electrical energy supply unit;
an applicator unit comprising an applicator electrode;
a return unit comprising a return electrode;
electrical circuitry;

the electrical energy supply unit arranged to apply electrical energy through a transmission circuit comprising the applicator electrode, a plant, and the return electrode, the electrical circuitry configured to:
- determine if a temperature of the apparatus has crossed a temperature threshold, and
- determine if a first electrical property of the electrical energy has crossed a first threshold;
- and, if either the temperature or the first electrical property has crossed the temperature threshold or the first threshold, respectively, the electrical circuitry is configured to control the first electrical property or another electrical property of the electrical energy of the electrical energy through the transmission circuit to reduce the temperature and/or the first electrical property that has exceeded the temperature threshold or the first threshold, respectively.

* * * * *